United States Patent [19]
Buczek

[11] 3,747,015
[45] July 17, 1973

[54] MAGNETIC STABILIZED CROSS FIELD FLOWING GAS LASER

[75] Inventor: Carl J. Buczek, Manchester, Conn.

[73] Assignee: United Aircraft Corporation, East Hartford, Conn.

[22] Filed: Jan. 13, 1972

[21] Appl. No.: 217,685

Related U.S. Application Data

[63] Continuation of Ser. No. 877,319, Nov. 17, 1969, abandoned.

[52] U.S. Cl.................................. 331/94.5, 330/4.3
[51] Int. Cl.............................................. H01s 3/10
[58] Field of Search..................... 331/94.5; 330/4.3

[56] References Cited
UNITED STATES PATENTS
3,509,487  4/1970  Bouwhuis et al. ................. 331/94.5
3,521,193  7/1970  Wingfield et al. ................. 331/94.5

*Primary Examiner*—William L. Sikes
*Attorney*—Anthony J. Crisco

[57] ABSTRACT

A flowing gas laser having an electric discharge plasma with the electric field oriented transversely with respect to the flow of gases therethrough is provided with a graduated magnetic field which is oriented transversely with respect to both the flow and the electric field to overcome the forces of flowing gases thereon. The plasma stabilizes at a point where the magnetic field force equals the force of the gas flow.

2 Claims, 2 Drawing Figures

MAGNETIC STABILIZED CROSS FIELD FLOWING GAS LASER

This is a continuation, of application Ser. No. 877,319, filed Nov. 17, 1969, now abandoned.

BACKGROUND OF THE INVENTION

1. Field of Invention

This invention relates to flowing gas lasers, and more particularly to means for stabilizing the electric discharge plasma thereof against the forces of flowing gases.

2. Description of the Prior Art

Recently, there has been a number of advances in the gas laser art. Particularly, it has become known that molecular, vibrational lasers of the flowing type are capable of extremely high power density, specific power and total power output. These characteristics are further enhanced in a flowing gas laser in which the optical gain region (which may be an optical cavity in the case of an oscillator, or one or more optical gain paths between suitable mirrors in the case of an amplifier) is coextensive with the electric discharge plasma within which the population inversion of the lasing gas is achieved. If the plasma extends outside of the optical gain region, the electrical efficiency and the total output power capability are decreased. Heating of the gases by the plasma is mitigated when the gas flows across the least dimension thereof. Thus, a laser with the optical gain path and plasma coextensively transverse to flow has been found to be highly desirable.

A difficulty resides in overcoming the flow field effects which the flowing gas has upon the plasma. Specifically, the plasma tends to be blown downstream, and thus out of a narrow optical gain region, or spread in an inefficient fashion across a broad optical gain region. To overcome this, compensation has been provided with RF pre-ionization means in a copending application of the same assignee entitled TRANSVERSE GAS LASER, Ser. No. 857,647, filed on Sept. 10, 1969 by Bullis and Penney. Another form of compensation has been provided with a magnetic field transverse to both the gas flow and the electric field in a copending application of the same assignee entitled MAGNETICALLY COMPENSATED CROSS FIELD FLOWING GAS LASER, Ser. No. 216,302 filed on Jan. 7, 1972 by Pinsley, Angelbeck and Buczek. However, in each of these cases the compensation is not completely stable, and it is difficult to provide, under all operating conditions, an invariantly positioned plasma which is confined to a desired configuration that is coextensive the optical gain region.

SUMMARY OF INVENTION

The object of the present invention is to provide improved stabilization for a transverse electric discharge plasma in a flowing gas laser.

According to the present invention, a graduated magnetic field is oriented transversely with respect to both gas flow and the electric field of a cross-field electric discharge flowing gas laser. The magnetic field exerts a graduated force on the electrons drifting from the cathode to the anode to create a force in the direction opposite to the flow of gases, which increases downstream of the desired position and which decreases upstream of the desired position, thereby providing a single, stable position of operation.

The present invention is capable of simple implementation, and provides an extremely stable, closely controlled cross-flow plasma.

The foregoing and other objects, features and advantages of the present invention will become more apparent in the light of the following detailed description of a preferred embodiment thereof, as illustrated in the accompanying drawing.

DESCRIPTION OF THE PREFERRED EMBODIMENT

Figure 2:
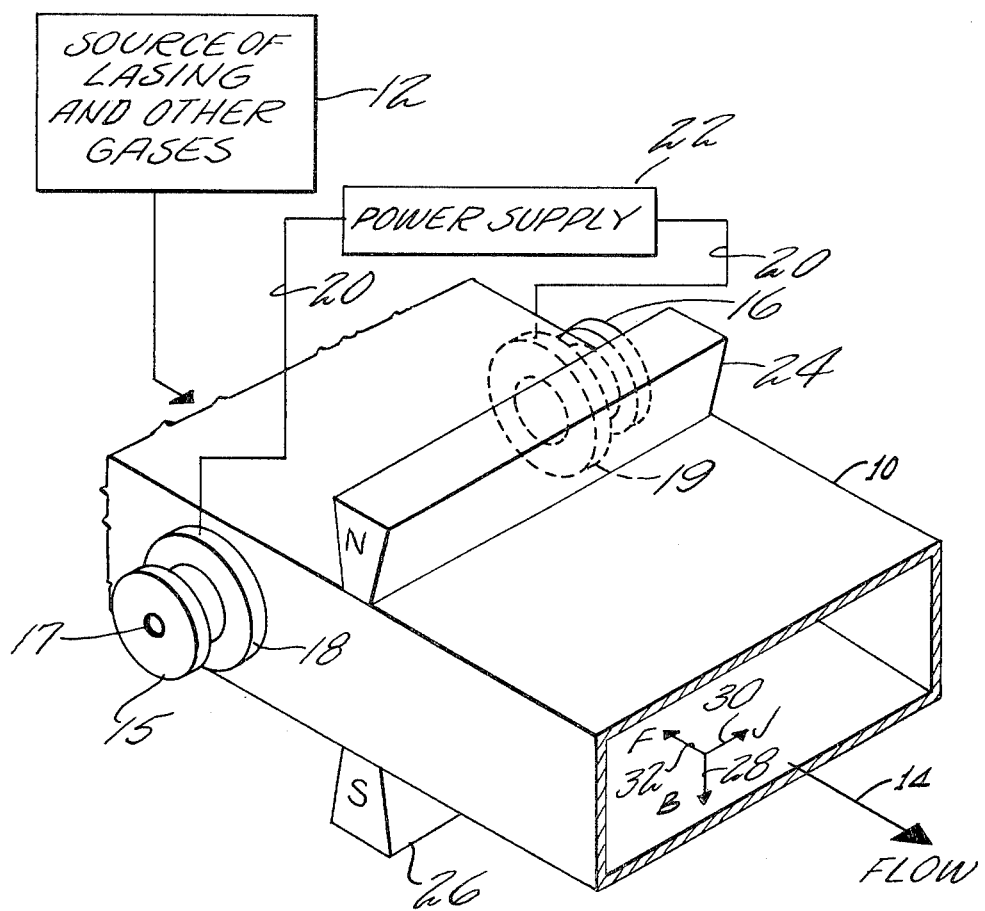
FIG. 2 is a simplified, schematicized, partially broken away perspective view of a flowing gas laser with magnetic flow field stabilization in accordance with the present invention.

Referring first to FIG. 2, a flowing gas laser incorporating the present invention comprises a conduit 10 through which lasing and other gases flow from a source 12 in a direction indicated by an arrow 14. The gas mixture may typically comprise nearly equal parts of carbon dioxide, nitrogen and helium, or other ratios or mixtures known in the art. It is important to note that the particular gas mixture is not really significant to the present invention since the invention incorporates the force effect of a magnetic field on drifting electrons within an electric discharge plasma, all of which is independent of the particular gas mixture employed; even though the electron drift rate depends in part on the gas mixture, the magnetic field strength and positioning can be adjusted as necessary.

Appended to the conduit 10 are structures which include mirrors 15, 16 to form an optical cavity, including suitable output coupling capability (such as a partially reflecting mirror or a hole 17 in one of the mirrors), as well as the anode 18 and cathode 19 necessary to establish an electric discharge plasma. The anode 18 and cathode 19 are connected by suitable electrical conductors 20 to a suitable power supply 22, all as is known in the art. Disposed on opposite sides of the conduit 10, downstream of the structures 15–19 are tapered magnetic pole pieces 24, 26 respectively. These create a magnetic field from top to bottom as viewed in the figure, and as indicated by the vector 28, which is graduated along the flow direction. The migration of electrons from the cathode to the anode result in a current vector (opposite to electron flow) in the direction from the anode 18 to the cathode 19 as shown by the vector 30.

As is known, the interaction between the current and the magnetic field will result in an upstream force as indicated by the force vector 32. This force is exerted upon the electrons, and tends to maintain the electrons in an area between the anode and cathode. However, the flow field effects on the ions are much greater than those on the electrons since the mass of the ions is several orders of magnitude greater than the mass of the electrons. However, electrical neutrality dictates that if the electrons are maintained in the area between the pole pieces, as the ions tend to be blown down-stream, there is an electrical force of attraction between them which causes the ions to remain in the same general vicinity with the electrons.

The magnetic field may be created by electromagnets instead of the permanent magnets 24, 26 if desired. The downstream end of the conduit 10 may be connected to suitable exhaust means so as to vent the gases to ambient; or suitable flow means may be provided so as to create a closed-loop or closed cycle system in which the gases are recirculated continuously through the conduit 10, as is known in the art. What is important to the present invention is that the magnetic field be capable of generating a force on the electrons as a result of the J-cross-B product which is opposite to the flow of gases through the electric discharge plasma. In gas lasers, such as $CO_2$ lasers, the plasma within the electric field is relatively weakly ionized. In such a case, the magnetic force exerted on the electrons by a magnetic field is given by the following relationship:

$$F = -e\mu EB$$

where
- $e$ - electric charge
- $\mu$ - electron mobility, which is primarily determined by collisions with neutral molecules
- $E$ - electric field
- $B$ - magnetic flux density.

Thus, the magnetic force exerted on the electrons is directly proportional to the magnetic field. By providing a gradient in the magnetic field, a gradient in the magnetic force can exist across some distance along the conduit 10, in the general vicinity of the optical gain region. It is this to which the improvement of the present invention relates.

Figure 1:
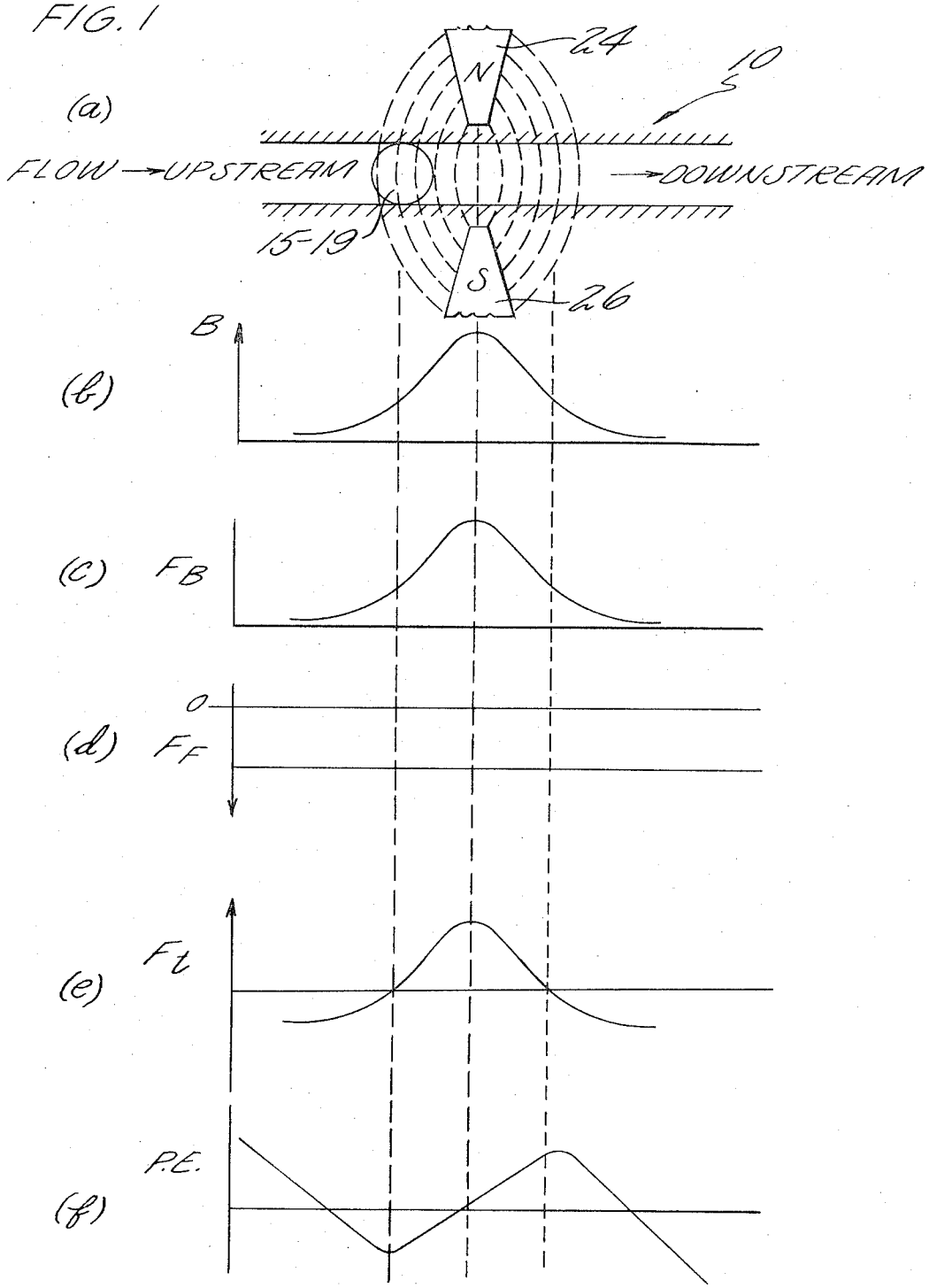
FIG. 1 is an illustration of the force effects obtaining in the present invention.

Referring now to FIG. 1, illustration (a) shows the magnetic pole pieces 24, 26 located slightly downstream of the optical gain region identified by the structures 15-19. The gradient of magnetic field, across the distance of the conduit 10 shown in illustration (a), is shown in illustration (b) of FIG. 1. Thus, the magnetic field is maximum directly between the pole pieces and has a gradient along the flow path, being lesser in both the upstream and downstream directions. The force resulting from the magnetic field, $F_B$, is shown in illustration (c) to be proportional to the magnetic field of illustration (b). On the other hand, the force due to the flow field, $F_F$, is a constant in the downstream direction as shown in illustration (d). These two forces combine in their action against the electrons (which in turn attract the ions and thereby stabilize the plasma) with a total force, $F_t$, as shown in illustration (e). There are two points at which the forces exactly balance, one point upstream and one point downstream of the center of the pole pieces 24, 26. However, one of these is a stable point and the other is a non-stable point. By choosing to locate the pole pieces so that they are downstream of the optical gain region, a stable point of operation, where the forces tend to balance is achieved. This is depicted more clearly in illustration (f) wherein the potential energy as a function of the distance along the conduit 10 ($x$) is plotted. This potential energy is given by the expression $P.E. = - \int F_t \, dx$.

In other words, at the point where the optical gain region (15-19) is located, there is a "potential well" such that any tendency of the discharge to be driven upstream by an excess of magnetic force results in a lessening of the magnetic force so that the flow field force will return it to the "potential well" position. On the other hand, any tendency of the flow field force to overcome the magnetic force and drive the discharge downstream causes the plasma to experience a stronger upstream magnetic force returning it to the center of the "potential well". This is the crux of the present invention.

Although the invention has been shown and described with respect to a preferred embodiment thereof, it should be understood by those skilled in the art that the foregoing and various other changes and omissions in the form and detail thereof may be made therein without departing from the spirit and the scope of the invention.

Having thus described a typical embodiment of our invention, that which we claim as new and desire to secure by Letters Patent of the United States is:

1. In a flowing gas laser of the type in which electrical power is coupled into the gas flowing through an optical gain region through electron collisions within an electric discharge plasma established in the optical gain region, and optical output power is coupled from the optical gain region, the combination comprising:
    means establishing an optical gain region;
    means providing a flow of a gas mixture including a lasing gas through said optical gain region;
    means establishing an electric discharge plasma within said optical gain region, the electric field of said plasma being transverse to the flow of gases through said optical gain region; and
    means establishing a graduated magnetic field having its lines of induction substantially transverse to the direction of both the flow of the gas mixture and the electric field in said optical gain region to generate a force on electrons in said plasma, as a result of electron drift in said electric discharge plasma, which is opposite to the direction of gas flow through said optical gain region the magnetic field across said optical gain region having a graduated intensity which increases along the direction of flow between the upstream and downstream locations in the gain region.

2. The gas laser according to claim 1 wherein said last named means is mounted downstream of said optical gain region and comprises tapered magnetic pole pieces disposed on opposite sides of the flow through said optical gain region.

* * * * *